(12) United States Patent
Even

(10) Patent No.: US 6,519,993 B2
(45) Date of Patent: Feb. 18, 2003

(54) MACHINE FOR CONFIGURING THE WINDING HEAD OF A STATOR OF A ROTARY ELECTRICAL MACHINE

(75) Inventor: Denis Even, Paris (FR)

(73) Assignee: Valeo Equipements Electriques Moteur, Creteil (FR)

(\*) Notice: Subject to any disclaimer, the term of this patent is extended or adjusted under 35 U.S.C. 154(b) by 3 days.

(21) Appl. No.: 09/852,718

(22) Filed: May 11, 2001

(65) Prior Publication Data

US 2002/0046779 A1 Apr. 25, 2002

(30) Foreign Application Priority Data

May 11, 2000 (FR) .............................................. 00.05991

(51) Int. Cl.⁷ ................................................ B21D 1/02
(52) U.S. Cl. .............................. 72/112; 72/125; 29/596; 29/605
(58) Field of Search ................................ 72/67, 68, 112, 72/115, 125; 29/596, 605; 140/105, 106, 123, 149

(56) References Cited

U.S. PATENT DOCUMENTS

| | | | | |
|---|---|---|---|---|
| 4,559,978 A | * | 12/1985 | Glatzel ......................... | 72/112 |
| 6,249,956 B1 | * | 6/2001 | Maeda et al. ................. | 29/596 |
| 6,339,871 B1 | * | 1/2002 | Maesoba et al. .............. | 29/596 |
| 6,425,175 B1 | * | 7/2002 | Sawada et al. ............... | 29/596 |

FOREIGN PATENT DOCUMENTS

| | | |
|---|---|---|
| DE | 4031276 | 4/1992 |
| FR | 2244284 | 4/1975 |

\* cited by examiner

*Primary Examiner*—Ed Tolan
(74) *Attorney, Agent, or Firm*—Liniak, Berenato & White

(57) ABSTRACT

A machine for configuring the winding head of a stator for a rotary electrical machine, which includes U-shaped conductors which are inserted axially into axial slots in the stator body, is of the type comprising a support body together with concentric tubular sleeves. The lower axial end part of each sleeve includes gripping means. The gripping means of each sleeve consist of a set of gripping slots, each of which has a right angled profile in circumferential and axial cross section. Each of these slots receives the free end portion of one conductor, so that rotation of a sleeve produces a single bend at the open end of the axial slot for each conductor in the associated layer of conductors in the stator.

5 Claims, 3 Drawing Sheets

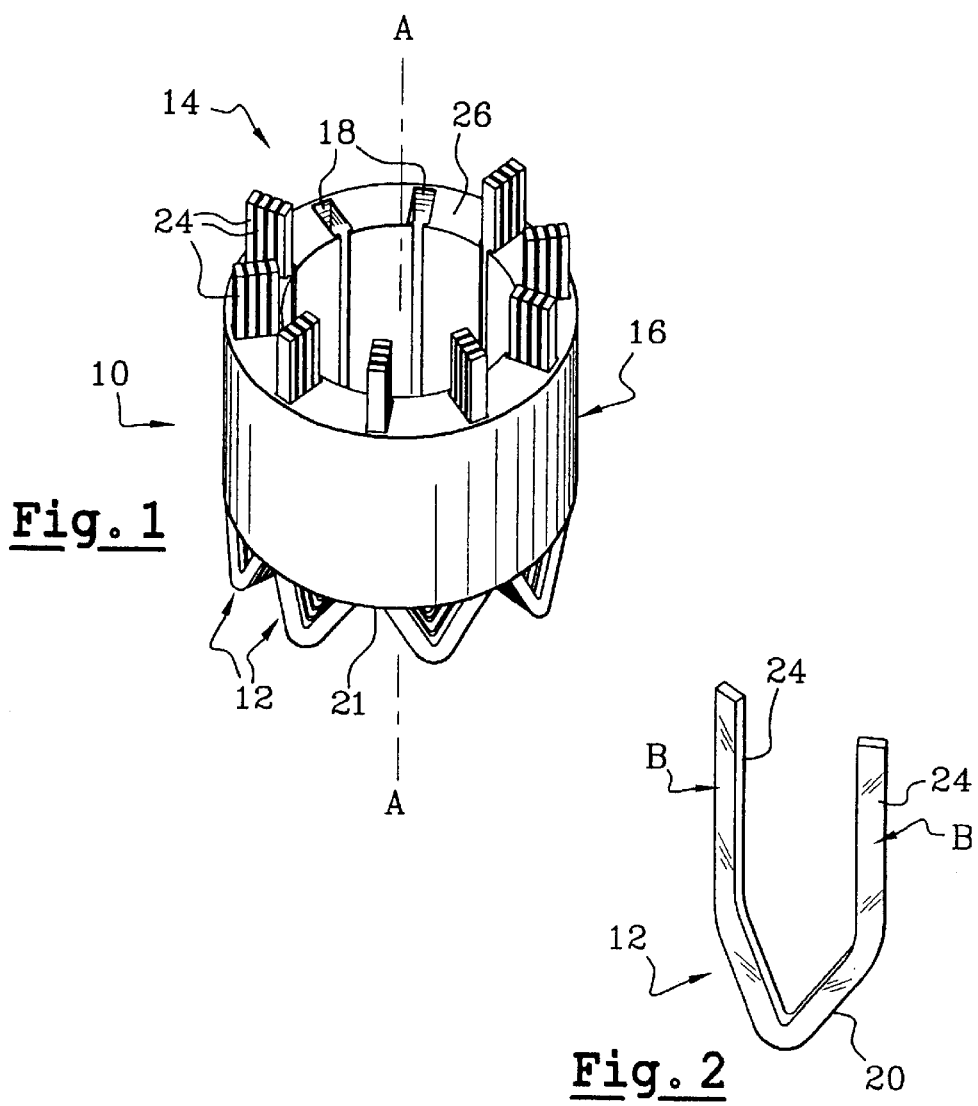
Fig. 1
Fig. 2
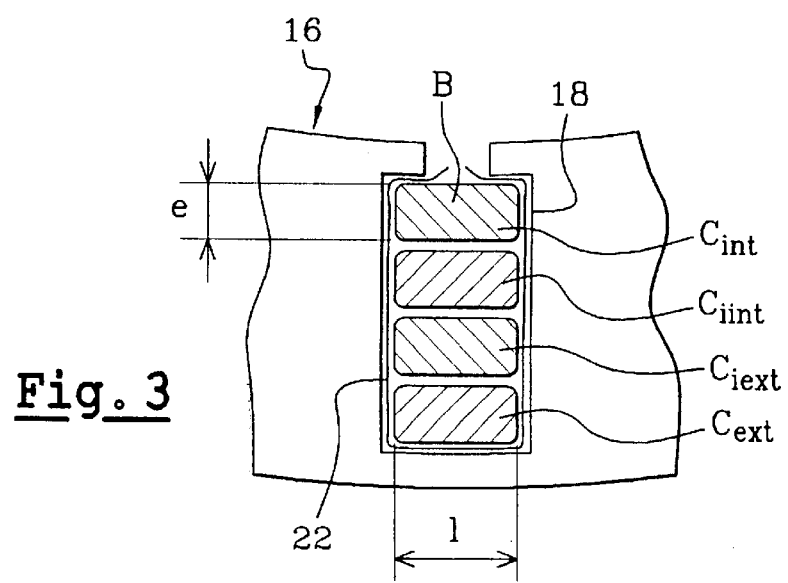
Fig. 3

MACHINE FOR CONFIGURING THE WINDING HEAD OF A STATOR OF A ROTARY ELECTRICAL MACHINE

FIELD OF THE INVENTION

The present invention relates to a machine and method for configuring the winding head of a stator for a rotary electrical machine.

More particularly, the invention relates to a machine for configuring the winding head of a stator for a rotary electrical machine, of the type in which the stator includes an annular cylindrical body having a set of open axial slots, of the type in which conductors, generally U-shaped and of rectangular cross section, are inserted into the axial slots in such a way that their free end portions extend substantially axially upwards on the side of the upper transverse face of the body, so as to constitute the winding head, of the type in which each axial slot contains at least two axial branches of the conductor, which are superimposed radially so as to define two layers of conductors, of the type comprising a support body which immobilises the stator body and conductors, together with concentric sleeves, each of which is of substantially tubular form, and which are arranged coaxially with the stator body, each sleeve being mounted for rotation about its axis with respect to the support body, wherein each sleeve includes, in facing relationship with a respective one of the said layers of conductors of the winding head, a lower axial end or working or configuring part, which is formed with gripping means for gripping the free end portions of the conductors in a respective one of the said layers, and of the type in which driving means are arranged to rotate each said sleeve in a direction of rotation opposite to the direction of rotation of an adjacent one of the said sleeves, whereby to bend in opposite directions the free end portions of the conductors in two adjacent said layers.

BACKGROUND OF THE INVENTION

Machines of the above kind are already known for configuring the winding head of an alternator stator. Such a machine generally includes tubular sleeves, the axial working or configuring end part of which is crenellated in such a way as to define gripping slots, with each gripping slot having a rectangular profile in circumferential and axial cross section. Each gripping slot has a form complementary with the free end of each axial branch of one of the said conductors, in such a way that it can receive and hold the latter. When a said sleeve is rotated about its axis and displaced axially towards the winding head, the free end portions of the associated axial branches are bent at the exit of the axial slots in the stator body, in the direction of the rotational movement.

It is noted that the free end portions which are received in the gripping slots keep their substantially axial orientation because they are immobilised by the free ends which are held in the gripping slots. Consequently, each free end portion is bent twice, namely once in the vicinity of the exit or open side of the axial slot, and once in the vicinity of the free end, before entry to a gripping slot.

This type of tooling is not well suited to the configuring of a winding head which has more than two free end portions superimposed radially in each axial slot of the stator body. In addition, this kind of tooling does not enable a winding head to be formed in which the free end portions are bent only once in the mouth of an axial slot in the stator body.

DISCUSSION OF THE INVENTION

An object of the invention is to overcome the above mentioned drawbacks. With this in view, according to the invention, a machine for configuring the winding head of a stator for a rotary electrical machine, of the type in which the stator includes an annular cylindrical body having a set of open axial slots, of the type in which conductors, generally U-shaped and of rectangular cross section, are inserted into the axial slots in such a way that their free end portions extend substantially axially upwards on the side of the upper transverse face of the body, so as to constitute the winding head, of the type in which each axial slot contains at least two axial branches of the conductor, which are superimposed radially so as to define two layers of conductors, of the type comprising a support body which immobilises the stator body and conductors, together with concentric sleeves, each of which is of substantially tubular form, and which are arranged coaxially with the stator body, each sleeve being mounted for rotation about its axis with respect to the support body, wherein each sleeve includes, in facing relationship with a respective one of the said layers of conductors of the winding head, a lower axial end or working or configuring part, which is formed with gripping means for gripping the free end portions of the conductors in a respective one of the said layers, and of the type in which driving means are arranged to rotate each said sleeve in a direction of rotation opposite to the direction of rotation of an adjacent one of the said sleeves, whereby to bend in opposite directions the free end portions of the conductors in two adjacent said layers, is characterised in that the gripping means of each said sleeve consist of a set of gripping slots, each of which has a substantially right-angled profile in circumferential and axial cross section, and each of which receives the free end portion of a respective conductor, whereby the said rotation of a said sleeve produces a single bending action at the exit of the axial slot for each conductor in the associated said layer.

According to a preferred feature of the invention, the configuring machine includes means for controlling the axial displacement of each said sleeve with respect to the support body, whereby to combine downward axial straight line motion with the rotary motion, so that the contact surface between the free end portion of each conductor and the associated gripping slot are optimised.

According to another preferred feature of the invention, each said conductor has a width greater than or equal to its thickness, and the conductors are superimposed radially in each axial slot in the direction of the thickness.

According to a further preferred feature of the invention, each said sleeve is caused to move in rotation until each free end portion describes at the exit of the axial slot an angle of about 45° with respect to the annular upper transverse face of the stator body.

According to yet another preferred feature of the invention, at the end of the rotational movement of the said sleeves, the sleeves are given a downward axial straight line movement with respect to the support body whereby to level up the height of the free end portions of the bent conductors.

Further features and advantages of the invention will appear more clearly on a reading of the following detailed description of preferred embodiments of the invention, given by way of non-limiting example only and with reference to the accompanying drawings.

BRIEF DESCRIPTION OF THE DRAWINGS

FIG. 1 is a perspective view showing diagrammatically the stator of a motor vehicle alternator before the winding head is configured.

FIG. 2 is a perspective view showing one of the conductors in the stator shown in FIG. 1.

FIG. 3 is a view in transverse cross section showing diagrammatically part of a radial stack of axial branches of conductors.

DESCRIPTION OF PREFERRED EMBODIMENTS OF THE INVENTION

Figure 4:
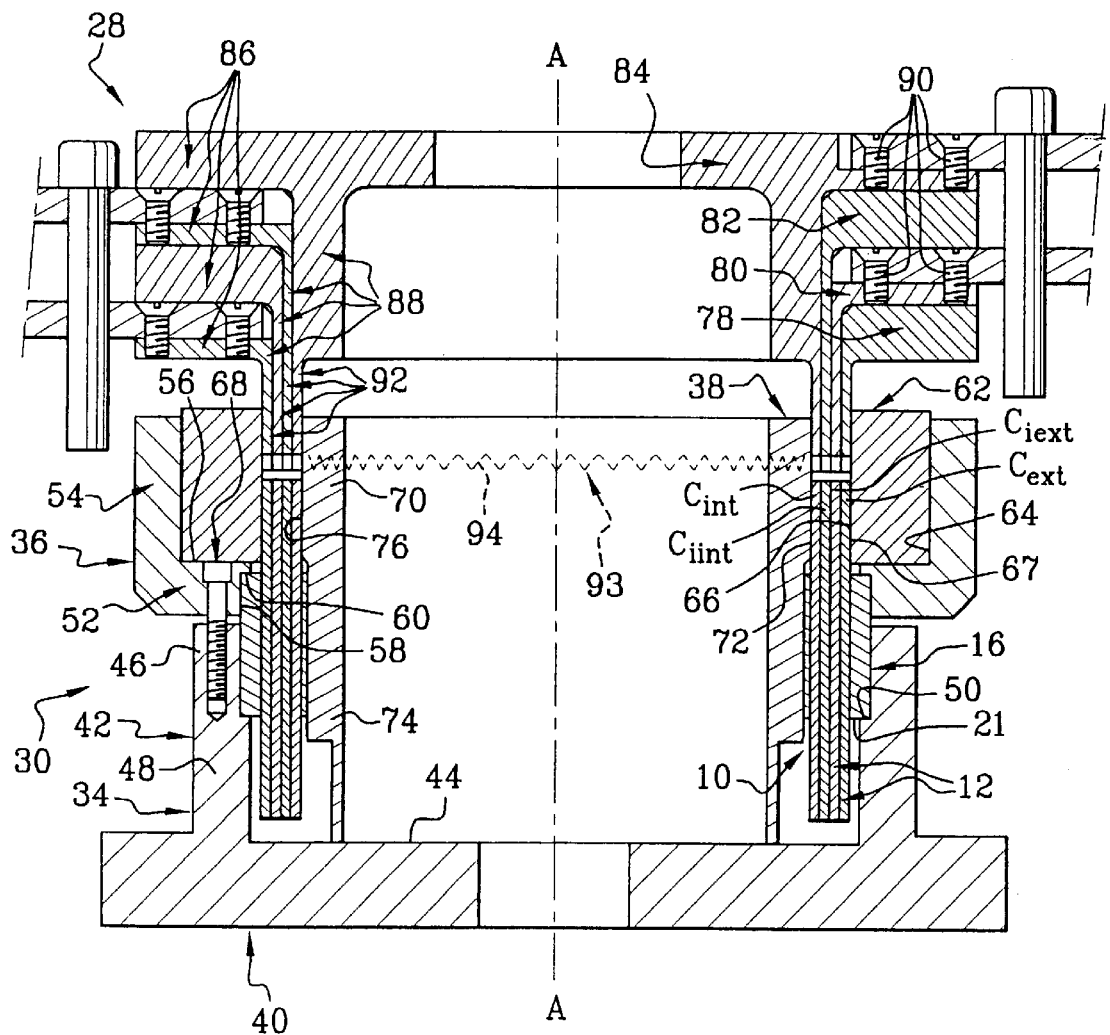
FIG. 4 is a view in axial cross section of a machine made in accordance with the features of the invention, for configuring the winding head of the stator shown in FIG. 1.

In the following description, and with reference to FIG. 1, an upper orientation and a lower orientation, with reference to the axis A—A of the stator, will be arbitrarily defined by way of non-limiting example. With a view to describing and explaining the operation of the machine according to the invention, an alternator stator will first be described, of the type which is arranged to be configured by means of a machine according to the invention.

With reference therefore to FIG. 1, an alternator stator 10 having its electrical conductors 12 is here shown before the operations of configuring its winding head 14. The stator 10 has a substantially cylindrical annular body 16 equipped with open axial slots 18 which are arranged to receive generally U-shaped conductors 12, or stirrups, axially. The stator body 16 consists, in the conventional way, of an axial stack of steel laminations, each of which is in the form of a ring. For more detail, reference should for example be made to German published patent specification DE 4031276A.

As shown in FIG. 2, each U-shaped conductor 12 has two substantially axially oriented branches B, which are received in the axial slots 18, together with a transverse connecting branch 20 which is arranged on the side of the lower transverse face 21 of the stator body 16.

The conductors 12 are of rectangular cross section, and in this example they have a width/which is greater than their thickness e, being of metal, and in this example of copper or a copper alloy. These conductive elements are of course coated with an insulating material, and are for example enamelled so as to prevent any short circuit occurring.

As is shown in FIG. 3, each axial slot 18 receives four axial branches B which are superimposed radially in the direction of the thickness e. The axial branches B thus form an external radial layer Cext, an external intermediate layer Ciext, an internal intermediate layer Ciint, and an internal layer Cint.

Within each axial slot 18, a leaf 22 of electrically insulating material is interposed between the radial stack of axial branches B and the stator body 16, so as to prevent any short circuits occurring.

Each conductor 12 has a first axial branch B which is inserted axially in a first axial slot 18, and a second axial branch B which is inserted axially in a second axial slot 18. It will be noted that the first and second axial slots 18 are consecutive slots 18 in a common electrical phase, and in this example they are separated by two axial slots 18 which receive conductors 12 of two other electrical phases.

The free end portions 24 of the axial branches B of conductors 12 emerge from the axial slots 18 on the side of the upper transverse face 26 of the stator body 16, so as to constitute the winding head 14 of the stator 10.

As is shown in FIG. 1, the free end portions 24 are oriented substantially axially before the operations of configuring the winding head 14 are carried out.

With reference now to FIG. 4, this shows a machine 28 for configuring the winding head 14, the machine being made in accordance with features of the present invention. The machine 28 includes a support body 30 which is arranged to receive the stator body 16 and to hold it still, with its conductors 12. The machine also includes a set of concentric sleeves 78, 80, 82, 84 which are tools for the configuring of the winding head 14.

In this case the support body 30 consists of a pedestal 34, together with an annular crown 36 and a central tube 38. The pedestal 34 comprises a transversely oriented, substantially flat base portion 40, together with a tubular portion 42 which projects axially upwards from the upper transverse face 44 of the base portion 40.

Preferably, the upper portion 46 of the tubular portion 42 defines, with the lower portion 48 of the tubular portion 42, an internal shoulder surface 50 or lower shoulder surface which is oriented upwards, so that the internal diameter of the upper portion 46 is substantially equal to the outer diameter of the stator body 16. The tubular portion 42 is therefore of stepped diameter internally.

The stator 10 is received axially, in the downward direction, by its lower axial end, in the tubular portion 42 of the pedestal 34, until the lower transverse face 21 of the stator body 16 comes into axial abutment against the lower shoulder surface 50.

The annular crown 36 includes a transverse lower collar portion 52 and an external axial skirt 54 which extends axially upwards from the top face 56 of the transverse collar portion 52. The inner axial surface 58 of the collar portion 52 is stepped internally in diameter and defines an inner shoulder surface 60, or upper shoulder surface, which is oriented downwards so that the largest internal diameter of the collar portion 52 is substantially equal to the external diameter of the stator body 16.

The annular crown 36 is fixed on the pedestal 34, for example by means of studs 68, so as to grip the stator body 16 axially between the lower shoulder surface 50 and the upper shoulder surface 60.

A radial retaining sleeve 62 is then inserted axially downwards into the axial skirt 54, so as to be interposed radially between the inner axial surface 64 of the axial skirt 54 and the outer axial faces 67 of the conductors 12 in the outer layers Cext of the winding head 14.

It will be noted that the outer diameter of the sleeve 62 is substantially equal to the inner diameter of the axial skirt 54, and the inner diameter of the sleeve 62 is substantially equal to the outer diameter of the winding head 14, which is delimited by the outer axial faces 67 of the conductors 12 in the external layers Cext.

The central tube 38 is then inserted axially into the stator 10. The central tube 38 comprises at least one upper portion 70 having an external diameter which is substantially equal to the internal diameter of the winding head 14 which is delimited by the inner axial faces 72 of the conductors 12 in the internal layers Cint, together with a lower portion 74, the outer diameter of which is smaller than or equal to the inner diameter of the stator body 16.

Figure 5:
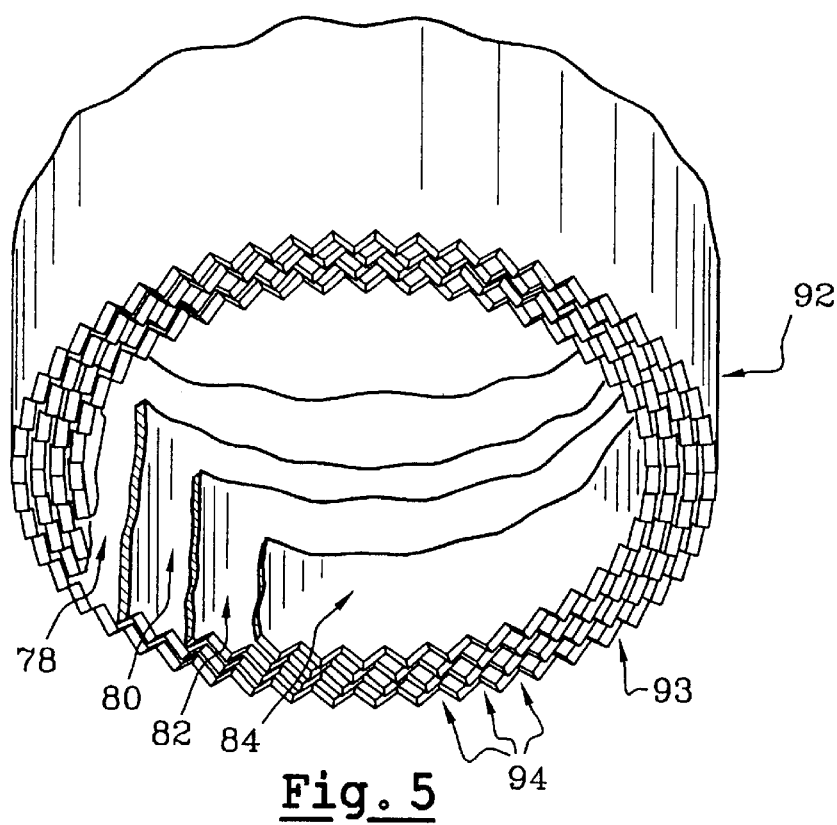
FIG. 5 is a perspective view, partly cut away, showing part of the concentric sleeves in the machine shown in FIG. 4.

When the central tube 38 has been inserted into the stator 10, the radial stacks of conductors 12 are retained axially between the axial inner surface 66 of the sleeve 62 and the axial outer surface 76 of the upper portion 70 of the central tube 38. The sleeves 78, 80, 82 and 84 are concentric with each other and coaxial with the stator 10. They are radially adjacent to each other, and can be seen best in FIG. 5 to which reference is now made.

Thus, the machine 28 includes: an external sleeve 78 which is associated with the external layer Cext; an outer intermediate sleeve 80 which is associated with the outer intermediate layer Ciext; an inner intermediate sleeve 82 which is associated with the inner intermediate layer Ciint; and an internal sleeve 84 which is associated with the internal layer Cint.

Figure 6:
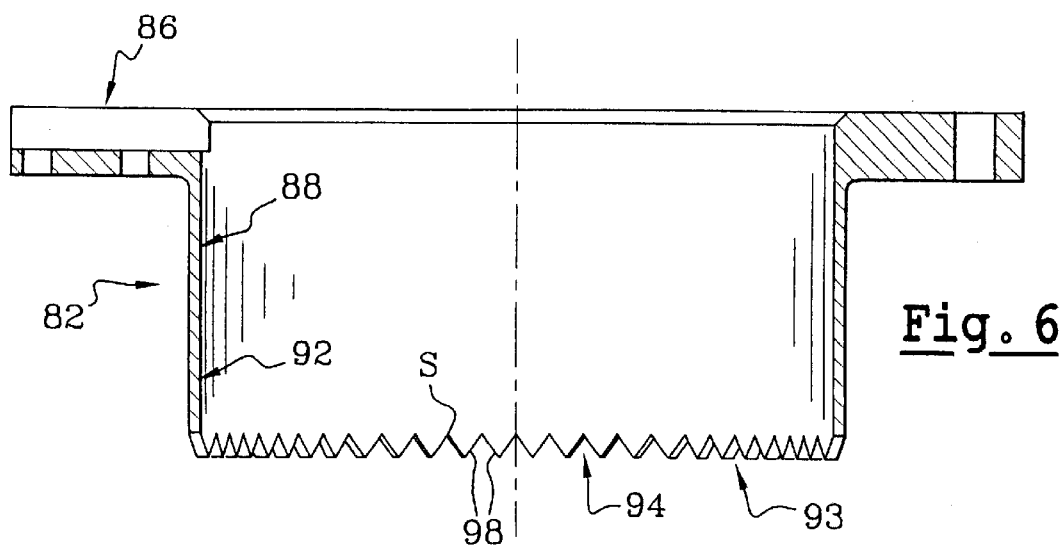
FIG. 6 is a view in axial cross section of the internal intermediate sleeve of the machine shown in FIG. 4.

The inner intermediate sleeve 82 is also shown, by itself, in FIG. 6, from which it can be seen that the sleeve 82 includes a transverse upper collar portion 86 and a lower tubular portion 88. The transverse collar portion 86 includes means 90 (see FIG. 4) for coupling it with a mechanism for driving it in both rotation and translation or straight line axial movement. This coupling means, which is partially shown, includes movable elements, each of which is associated with a collar portion fixed on that element by the coupling means 90. In this example the means 90 consist of screws. In this case the said elements are associated with each other in pairs by means of studs, the sleeves 80 and 84 constituting one pair and the sleeves 82 and 78 another pair. The tubular portion 88 includes a lower part 92 which is a working or configuring part.

The lower axial end 93 of the working part 92 includes a set of gripping slots 94, each of which has a right angled profile in circumferential and axial cross section. Each of the slots 94 receives the free end portion 24 of conductor 12 in the intermediate inner layer Ciint.

Each gripping slot 94 therefore has two straight edges 98 which are inclined symmetrically at 45° with respect to the axis A—A, so that they define between them a right angle with an apex S.

Preferably, the working or configuring part 92 has a thickness which is substantially equal to the thickness e of one conductor 12. Preferably also, the sleeves 78, 80, 82 and 84 are substantially similar to each other and are fixed together for axial straight line motion.

The operation of the machine 28 during operations for configuring a winding head 14 of the stator 10 will now be explained.

After the stator 10 has been positioned in the support body 30 in the way described above, the sleeves 78, 80, 82 and 84 are moved axially downwards, under control, until each free end portion 24 of a conductor 12 is received in a respective gripping slot 94.

Figures 7, 8:
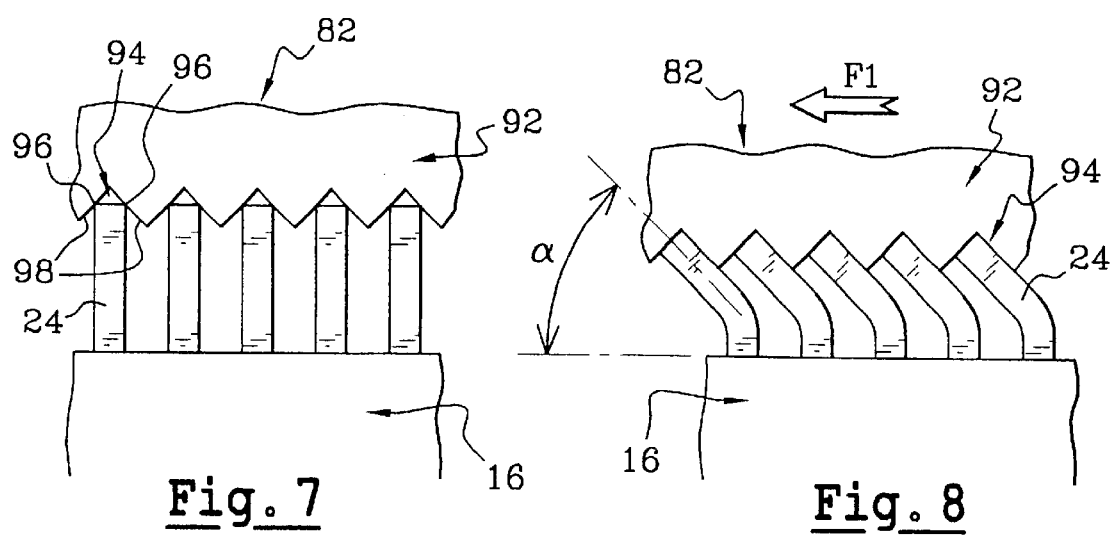
FIG. 7 is a diagram illustrating the position of the free end portions of a layer of conductors, and the position of the slots for gripping the associated sleeve, before the operation of configuring the winding head.
FIG. 8 is a diagram similar to FIG. 7, but shows the position of the free end portions of a layer of conductors and the position of the slots for gripping the associated sleeve after the operation of configuring the winding head.

As can be seen in FIG. 7, given that the free end portions 24 of the conductors 12 are oriented substantially axially in this case, each free end portion 24 is in contact through its circumferential terminal edges 96 with the inclined edges 98 of the associated gripping slot 94.

Each of the four sleeves is then pivoted about the axis A—A. It is required here that the free end portions 24 of the conductors 12 in the external layer Cext and the internal layer Cint are bent clockwise, and that the free end portions 24 of the conductors 12 in the intermediate layers Ciint and Ciext are bent anti-clockwise. Consequently, the external sleeve 78 and internal sleeve 84 are rotated clockwise, and the intermediate sleeves 80 and 82 are rotated anti-clockwise. Downward axial straight line motion of the four sleeves is preferably combined with the pivoting (rotating) motion of the sleeves with respect to the support body 30, so that the contact surface between the free end portions 24 of each conductor 12 and the associated gripping slot 92 is optimised during the whole of the pivoting movement.

The pivoting motion is stopped when each free end portion 24 describes, at exit from the corresponding axial slot 18, an angle of about 450° with respect to the upper annular transverse face 26 of the stator body 16. It is found that each free end portion 24 describes such an angle when its transverse free end face is substantially parallel and in contact with one of the inclined edges 98 of the associated gripping slot 94.

FIG. 8 shows the position of the free end portions 24 after the operations of configuring the winding head 14 just described, and in particular after one rotation of the sleeve 82 in the direction of the arrow F1.

Since the free end portions 24 are substantially in the form of parallelepipeds, it is found that they nest in a complementary manner in the base of the gripping slots 94.

At the end of the pivoting motion, or after this movement is stopped, a slight axial straight line motion of the sleeves 78, 80, 82 and 84 is effected downwards, so as to level up the height of the free end portions 24 of the conductors 12.

In a modified embodiment of the invention which is not shown, axial rebates are formed in the inner axial surface 66 of the retaining sleeve 62, each of these rebates being arranged to receive one free end portion 24 of a conductor 12 in the external layer Cext before the configuration operations are carried out on the winding head 14. Appropriate means are also provided for pushing the corresponding free end portions 24 into the axial notches. This version enables the corresponding free end portions 24 to be bent, using suitable means, in the opposite direction from the direction in which the free end portions 24 of the conductors 12 in the external layer Cext are bent.

The free end portions 24 which are bent in the opposite direction will then be able to be connected electrically, for example by soldering, to the radially adjacent free end portion 24, so as to connect two stator windings electrically together in a common electrical phase.

For example, in a stator 10 having three phases each of which is constituted by two stator windings, three axial notches will be formed in the sleeve 62, that is to say one for each phase.

What is claimed is:

1. A machine for configuring a stator winding head, for a rotary electrical machine comprising a stator, the stator comprising an annular cylindrical body having a top transverse face and defining a set of open axial slots, the stator further comprising a plurality of generally U-shaped conductors of rectangular cross section, each having axial said branches with free end portions, with branches of at least two said conductors, superimposed radially, being received in each said open axial slot so that said free end portions extend substantially axially upwards on the side of the top transverse face of the body, said conductors, radially superimposed, constituting two layers of said conductors, said configuring machine comprising a support body for immobilizing the stator body and said conductors, and further comprising a plurality of substantially tubular concentric sleeves coaxial with said stator body, and a mounting means each of said sleeves for rotation about its axis with respect to the support body, each of said sleeves having an axial end portion defining a configuring part of the sleeve and oriented so as to lie facing said layer of conductors in said winding head placed in the configuring machine, each said configuring part defining gripping means for gripping said free end portions of the conductors of said layer, the configuring machine further including drive means coupled to said mounting means for rotating each of said sleeves in a first direction of rotation opposed to a second direction of rotation of an adjacent sleeve, whereby to bend said free end portions of the conductors of two adjacent said layers in opposite directions, wherein, in each said sleeve, the said gripping means comprise a set of gripping slots, each having a substantially right angled profile in circumferential and axial cross section, for receiving said free end portion of a conductor whereby rotation of the sleeve forms a single bend in each conductor in the associated said layer at an exit of the axial slot.

2. A configuring machine according to claim 1, further comprising means for effecting controlled axial displacement of each of said sleeve with respect to the support body, whereby to combine downward axial straight line movement with said rotational movement so as to optimize a contact surface area between the corresponding conductor free end portion and said gripping slot.

3. A configuring machine according to claim 1, wherein each of said conductors having a width at least as great as its thickness, the conductors being superimposed radially in each of said axial slots in the direction of said thickness.

4. A method of configuring a stator winding head using a machine according to claim 1, including the step of rotating each of said sleeves until each said free end portion describes, on leaving the corresponding axial slot, an angle of about 45° with respect to the top transverse face of the stator body.

5. A method according to claim 4, further including the step of, at the end of the rotation of the sleeves, displacing the sleeves in an axial downward straight line motion with respect to the support body, to thereby level up a height of said free end portions of the bent conductors.

* * * * *